June 19, 1962 C. SOVA 3,039,728
PUSH-BUTTON-OPERATED ARTICLE HOLDER
Filed June 16, 1960
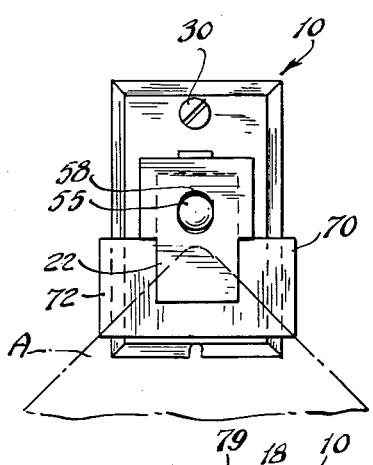
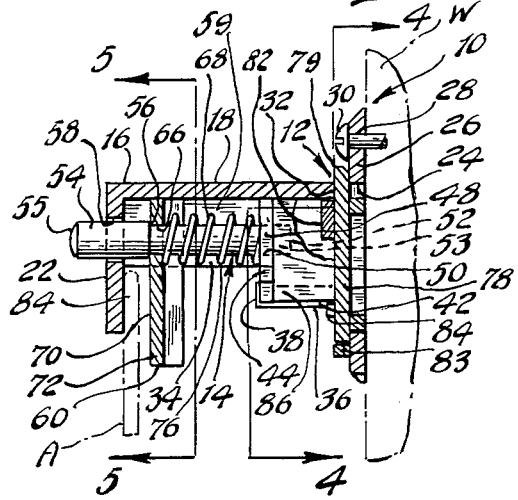
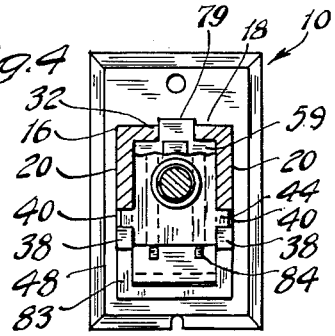
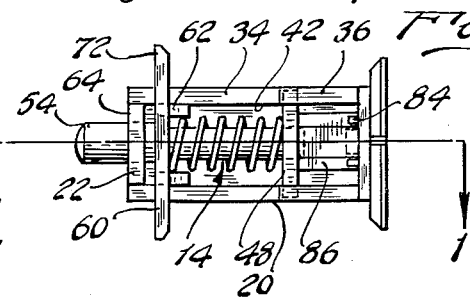
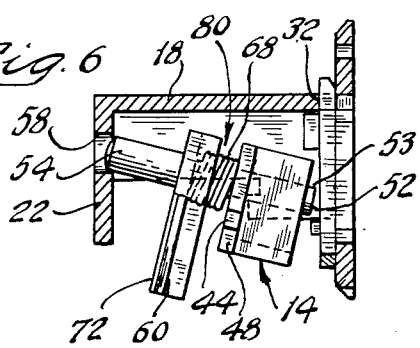
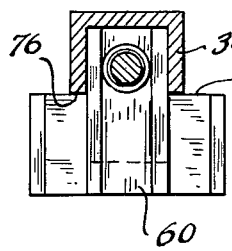
INVENTOR.
CLARENCE SOVA
BY Barthel & Bugbee
ATTORNEYS

United States Patent Office 3,039,728
Patented June 19, 1962

3,039,728
PUSH-BUTTON-OPERATED ARTICLE HOLDER
Clarence Sova, 729½ Pierre Ave., Windsor,
Ontario, Canada
Filed June 16, 1960, Ser. No. 36,516
3 Claims. (Cl. 248—316)

This invention relates to releasable article holders and, in particular, to push-button-operated article holders.

One object of this invention is to provide a push-button-operated article holder which is of such simplified construction as to be capable of production by easy and inexpensive molding and assembly operations, with a minimum of manipulation required in order to fit the parts together.

Another object is to provide a push-button-operated article holder of the foregoing character wherein the parts, when once assembled, will remain in assembly without danger of accidental disassembly.

Another object is to provide a push-button-operated article holder of the foregoing character wherein the individual components of the holder are conveniently made of synthetic plastic material and wherein certain of these components, such as the supporting mount or casing, are simply and easily produced by molding operations.

Other objects and advantages of the invention will become apparent during the course of the following description of the accompanying drawings, wherein:

FIGURE 1 is a central longitudinal vertical section taken along the line 1—1 in FIGURE 3, through a push-button-operated article holder according to one form of the invention, shown as attached to a wall, indicated in dotted lines, and holding an article, also indicated in dotted lines;

FIGURE 2 is a front elevation of the article holder shown in FIGURE 1, with an article held thereby indicated in dotted lines;

FIGURE 3 is a bottom plan view of the article holder shown in FIGURES 1 and 2;

FIGURE 4 is a vertical cross-section taken along the line 4—4 in FIGURE 1;

FIGURE 5 is a vertical cross-section taken along the line 5—5 in FIGURE 1; and

FIGURE 6 is a view similar to FIGURE 1, but showing the relative positions of the parts during assembly, prior to their reaching their final positions shown in FIGURES 1 to 5 inclusive.

The present invention provides a push-button-operated article holder which is an improvement on such holders previously invented by me, as shown in my U.S. Patent No. 2,459,006 of January 11, 1949, for Tie Rack, and my application Serial No. 754,420, filed August 11, 1958, now Patent No. 2,973,099 issued February 28, 1961, for Multiple Article Holder, in that it provides a simpler construction which is made up of components produced by molding or simple machining operations and assembled with a minimum of operations occupying the least time. In my previous push-button-operated article holders, as set forth in the abovementioned patent and application, the cost of production was higher than it was subsequently believed to be necessary, in view of the more complex construction employed therein. The present invention, in addition to providing ease of manufacture and assembly, also maintains the parts in their assembled positions without danger of accidental disassembly, yet permits intentional disassembly when this is desired.

Referring to the drawing in detail, FIGURES 1 to 5 inclusive show a push-button-operated article holder, generally designated 10, according to one form of the invention as consisting generally of a push-button-operated article holder support or casing 12 and a push-button-operated article-holding plunger unit 14 which is mounted in the support 12 in the manner described below in connection with the description of the assembly of the component parts. The article holder support 12 is approximately in the form of an open-bottomed box structure 16, preferably molded from metal or synthetic plastic, and having a top wall 18, opposite parallel depending side walls 20 and a front wall 22, the rearward end being open as at 24 and there being provided with an integral flange-like mounting plate 26. Fastener holes 28 are provided in the mounting plate 26 for receiving fasteners 30 by which the article holder 10 is secured to an interior building wall of the like W (FIGURE 1).

The top wall 18 near the mounting plate 26 (FIGURE 4) is provided with a slot 32; the side walls 20 have forward and rearward portions 34 and 36 (FIGURE 1) of different vertical widths, with vertical edges or shoulders 38 on the wide portion 36. The edges 38 have aligned horizontal notches 40 therein located a short distance above the lower edges 42 of the rearward or wider portions 36. The side wall notches 40 are provided for the reception of lateral tongues 44 in an approximately rectangular spring abutment plate 48.

The spring abutment plate 48 (FIGURE 1) has an approximately central hole 50 thereon slidably receiving the rearward end of a rod or plunger 52 having a shank 53 carrying at its forward end an enlarged head or push-button 54 with a rounded forward end 55. An annular shoulder 56 occurs between the shank 53 and the head 54. The head 54 passes through an enlarged hole 58 in the front wall 22 aligned with the hole 50. Slidably mounted in the inverted trough-shaped or channel-shaped recess 59 formed by the top and side walls 18 and 20 of the box portion 16 is a pressure plate 60 of channel-shaped cross-section with side ribs 62 (FIGURE 3) interconnected by a front wall 70. The front wall 70 is provided with a hole 66 aligned with the holes 50 and 58 and adapted to receive the shank 53. The pressure plate 60 is urged against the shoulder 56 by the forward end of a helical compression spring 68 coiled around the shank 53 of the rod 52, the rearward end of which is seated against the abutment plate 48. The pressure plate 60 has side wings 70 and an article-contacting front surface 72. The upper edge 74 of the pressure plate 60 slidably engages the lower edges 76 (FIGURE 5) of the narrow portion 34 of the side walls 20. A backing plate 78 is mounted in the recess 59 to close the opening 24 and has a tongue 79 extending through the slot 32 and an upper stop 82 engaging the top wall 18. The backing plate 78 rests against and within a U-shaped rib 83 secured to the mounting plate 26 (FIGURES 1 and 4). The backing plate 78 is provided with laterally-spaced lower stops 84 holding the lower edges of the side walls 86 of the abutment plate 48 in position vertically.

In the assembling of the article holder 10, the operator first inserts the backing plate 78 in the recess 59 with its tongue 79 in the slot 32 and with its lower edge seated within the U-shaped rib 83. He then assembles the plunger subassembly 80 shown in the lower portion of FIGURE 6 by threading the pressure plate 60 onto the shank 53 of the plunger 52, followed by the compression spring 68 and the abutment plate 48 in the order named. He then pushes together the pressure plate 60 and abutment plate 48, holding them between the thumb and forefinger or between the opposite jaws of a pair of pliers or tongs, compressing the spring 68. Holding the subassembly 80 in its compressed condition (FIGURE 6), he inserts it through the bottom opening of the box portion 16 of the support 12 with the head 54 inserted in the hole 56 from the rearward side of the front wall 22. With the latter arrangement as a pivot, he then swings the rearward portion of the plunger 52 upward while holding the subassembly 80 still compressed and at the same time causing the lateral tongues 44 to move upward past the vertical edges or shoulders 38 until they arrive adjacent lateral notches 40 and the abutment plate side walls 86 lie adjacent the backing plate 78.

The operator then releases his pressure upon the pressure plate 60 and abutment plate 48, whereupon the compression spring 68 forces the pressure plate 60 forward until the contact plate 72 engages the front wall 22, while at the same time the rearward spring pressure forces the lateral tongues 44 of the abutment plate 48 into their respective notches 40 in the shoulders 38 between the wide and narrow portions 36 and 34 of the side walls 20. The parts come to rest approximately in the positions shown in FIGURE 1 from the relative positions shown in FIGURE 6, except that the contact plate 72 is in engagement with the front wall 22 rather than spaced a slight distance away from it as in FIGURE 1.

In the operation of the invention, let it be assumed that the push-button-operated article holder 10 has been secured to a wall W by fasteners 30 through the holes 28 and that it is desired to hang an article A, such as a washcloth or towel, from it. To do this, the operator applies his thumb to the rounded end 55 of the plunger head 50 and pushes inward or rearward thereon. This action pushes the pressure plate 60 and contact plate 72 rearwardly toward the spring abutment plate 48 (FIGURE 1), compressing the spring 68 and opening up a gap between the contact plate 72 and the front wall 22. While holding the plunger 52 in this position with the thumb of one hand, he grasps the edge portion or corner portion of the article A between the thumb and forefinger of his other hand and pushes it upward into the gap 84 thus opened up between the contact plate 72 and the front wall 22. While holding the article A in this position, he releases the pressure of his thumb upon the head 54 of the push button plunger 52, whereupon the thrust of the compressed spring 68 urges the pressure plate 60 and contact plate 72 forward so as to tightly grip the article A between the contact plate 72 and front wall 22.

To release the article A, the user merely reverses the foregoing procedure. The instant he pushes inward upon the head 54 of the push button plunger 52, the contact plate 72 moves away from the front wall 22, releasing its grip upon the article A which can then be removed.

While for convenience and simplicity of showing, the invention has been illustrated as consisting of but a single unit of the article holder 10 with only a single plunger 52, it will be understood that multiple units may be employed arranged side by side and mounted either independently upon the wall W or upon a common mounting plate or board which is then secured to the wall W or suspended or supported by any suitable means.

What I claim is:

1. A push-button-operated article holder comprising a hollow support having a rear wall structure and side walls and a front wall at least partially enclosing a guideway cavity, said front wall having a hole therethrough, a spring abutment member disposed in said guideway cavity in spaced relationship to said front wall and having a hole therein aligned with said front wall hole, means detachably securing said abutment member to said wall structure, an elongated plunger slidably mounted in said holes and having a push-button portion extending through said front wall, an article-engaging member mounted on said plunger and movable therewith, and a spring interposed between said abutment member and said article-engaging member and urging said article-engaging member toward said front wall whereby to yieldingly hold an article therebetween, said securing means including locking recesses in said side walls and projections on said abutment member engaging said recesses.

2. A push-button-operated article holder, according to claim 1, wherein said side walls have widened portions therein and wherein said locking recesses are disposed in said widened portions.

3. A push-button-operated article holder, according to claim 1, wherein said hollow support has a top wall with a hole therein and wherein a backing member is disposed in said hollow support between said rear wall structure and said spring abutment member, said backing member having a projection thereon disposed in said hole.

References Cited in the file of this patent

UNITED STATES PATENTS 2,459,006     Sova                    Jan. 11, 1949